US008236414B2

(12) United States Patent
Piluso et al.

(10) Patent No.: US 8,236,414 B2
(45) Date of Patent: Aug. 7, 2012

(54) REFRACTORY CERAMIC MATERIAL HAVING A HIGH SOLIDUS TEMPERATURE, ITS MANUFACTURING PROCESS AND STRUCTURAL PART INCORPORATING SAID MATERIAL (75) Inventors: Pascal Piluso, Pertuis (FR); Mélusine Ferrier, Paris (FR); Jean-Pierre Bonnet, Carignan-de-Bordeaux (FR)

(73) Assignees: Commissariat a l'Energie Atomique, Paris (FR); Ecole Nationale Superieure de Ceramique Industrielle, Limoges (FR)

( * ) Notice: Subject to any disclaimer, the term of this patent is extended or adjusted under 35 U.S.C. 154(b) by 421 days.

(21) Appl. No.: 12/520,769

(22) PCT Filed: Dec. 21, 2007

(86) PCT No.: PCT/FR2007/002146
§ 371 (c)(1),
(2), (4) Date: Aug. 7, 2009

(87) PCT Pub. No.: WO2008/096071
PCT Pub. Date: Aug. 14, 2008

(65) Prior Publication Data
US 2009/0305027 A1    Dec. 10, 2009

(30) Foreign Application Priority Data
Dec. 21, 2006   (FR) ..................................... 06 11175

(51) Int. Cl.
*B32B 3/26* (2006.01)

(52) U.S. Cl. ............... 428/312.8; 428/314.8; 428/314.4; 428/315.5; 428/315.7; 428/316.6; 428/697; 428/702; 428/314.2

(58) Field of Classification Search ........................ None
See application file for complete search history.

(56) References Cited

U.S. PATENT DOCUMENTS
5,681,784 A    10/1997   Friese
2005/0112389 A1   5/2005   Loureiro et al.

FOREIGN PATENT DOCUMENTS
DE    4237272 A1    8/1993
EP    0554637 A1    12/1992
EP    1 772 441    4/2007

OTHER PUBLICATIONS
Translation of DE 42 37 272 A1.*
International Search Report in corresponding French application PCT/FR2007/002147 issued Aug. 27, 2008 (4 pages).

* cited by examiner

*Primary Examiner* — Ling Xu
(74) *Attorney, Agent, or Firm* — Browdy and Neimark, PLLC (57) ABSTRACT A refractory ceramic material possessing a solidus temperature between 2500° C. and 2800° C., having a compactness greater than 85%, and a microstructure such that the material is composite of: (a) hafnium dioxide $HfO_2$ grains having a monoclinic structure (1); (b) hafnium dioxide $HfO_2$ grains having a cubic structure (2) which is stabilized by yttrium oxide $Y_2O_3$, the yttrium oxide $Y_2O_3$ representing 0.5 mol % to 8 mol % relative to the total number of moles of hafnium dioxide $HfO_2$; (c) closed pores (3); (d) non-interconnected open pores. The process of manufacturing the material and a structural part incorporating the material are also set forth.

21 Claims, 5 Drawing Sheets

| Moles of $Y_2O_3$ | Solidus temp. | Compactness after sintering ($C_1$) | Porosity (100−$C_1$) | Open porosity (non-traversing) | Closed porosity | Compactness after transition at 1800°C ($C_2$) | Volume difference ($C_2$−$C_1$) | Cracking |
|---|---|---|---|---|---|---|---|---|
| 8 % | 2500°C | 86,3 % | 13,7 % | 0,4 % | 13,3 % | 88,8 % | 2,31 % | No |
| 5 % | 2500°C | 90,8 % | 10,7 % | 0,4 % | 10,3 % | 91,6 % | 0,79 % | No |
| 3 % | 2610°C | 91,8 % | 8,2 % | 0,5 % | 7,7 % | 92,5 % | 0,72 % | No |
| 1 % | 2800°C | 96,4 % | 3,6 % | 0,5 % | 3,1 % | 96,6 % | 0,24 % | ~ No |
| 0,5 % | 2805°C | 96,0 % | 4,0 % | 2,9 % | 1,1 % | / | / | ~ Yes |
| 0 % | 2810°C | 96,0 % | 4,0 % | 3,6 % | 0,4 % | 98,5 % | 1,63 % | Yes |

REFRACTORY CERAMIC MATERIAL HAVING A HIGH SOLIDUS TEMPERATURE, ITS MANUFACTURING PROCESS AND STRUCTURAL PART INCORPORATING SAID MATERIAL

TECHNICAL FIELD

The present invention relates to the field of oxide-based refractory materials, and relates in particular to a refractory material having a high solidus temperature, a process for manufacturing the same, and a structural part incorporating said material.

BACKGROUND ART

In a nuclear power plant, when a failure occurs in the means intended for the removal of residual power from the nuclear reactor, a loss in the cooling of nuclear fuel may be induced. In some circumstances, this loss may lead to partial or total core meltdown. The probability of such an accident, although extremely small, is not zero.

In order to prevent and manage the consequences of such an accident both on the population and the environment, a severe accident in a nuclear reactor core (in particular a Pressurized Water Reactor (PWR)) is simulated by melting sections of nuclear fuel rods that have previously been irradiated, in an induction furnace made of oxide-based refractory materials.

During such experiments, in which the temperature is varied (reaching up to 2600° C.) and the atmosphere is changed (for example, to neutral or oxidizing), the nuclear fuel behavior is studied, and fission products and actinides which are released are identified and analyzed.

The oxide-based refractory parts of the furnace must at least fulfill the following criteria:

mechanical strength up to a temperature of 2600° C.,
tightness to gases generated during the experiment,
chemical resistance to various types of atmosphere (in particular reducing, oxidizing, neutral, comprising air, water vapor),
chemical resistance to corrosion and/or high temperature ablation, which may be caused by baths consisting of oxides and metals, for a duration of at least 15 minutes. Such interactions are generated, for example, when the refractory material is brought into contact with the corium. The latter is magma which results from the high-temperature meltdown of the nuclear fuel, followed by a reaction of the molten fuel with its cladding and the structural elements of the nuclear reactor. Most often, it is composed of corrosive baths of oxides and metals, heated-up above their melting point or solidus temperature. These oxides are, in particular, uranium, zirconium and iron oxides.

In order to fulfill such criteria, until 2003, the refractory parts of these furnaces were manufactured from thorium dioxide $ThO_2$, which oxide has a melting temperature of 3380° C.

However, since thorium dioxide $ThO_2$ is radioactive, it is difficult to implement and attempts are being made to replace it by another non-radioactive refractory material which also fulfills the above criteria. One candidate material is hafnium dioxide $HfO_2$.

Hafnium dioxide $HfO_2$ has three crystalline structures, each of which has its own stability domain as a function of temperature and pressure. At atmospheric pressure, these domains are as follows:

below 1700° C.: monoclinic structure,
from 1700° C. to 2600° C.: quadratic structure,
from 2600° C. to 2810° C.: cubic structure,
above 2810° C.: liquid state.

Hafnium dioxide $HfO_2$ has a melting point of 2810° C. and is also well known to withstand chemical interactions under heat. It therefore appears to be a good candidate for the replacement of thorium dioxide $ThO_2$ as a refractory material used in the composition of furnace parts enabling the above-mentioned simulations to be carried out.

However, pure hafnium dioxide $HfO_2$ has a major drawback in high temperature applications, in that, during thermal cycling (increasing/decreasing temperature), its allotropic transformation from the monoclinic phase to the quadratic phase is accompanied by a 3.4% shrinkage (or a volume expansion during the opposite transformation) between 1500° C. and 1800° C. As an unacceptable consequence of this large volume change, cracking of the refractory ceramic material consisting of hafnium dioxide $HfO_2$ occurs.

From U.S. Pat. No. 5,681,784, it is known that this volume change may be prevented by stabilizing the hafnium dioxide $HfO_2$ in its cubic phase (high temperature phase) by means of additives. For that purpose, to the hafnium dioxide $HfO_2$ material, 8 mol % to 12 mol % yttrium oxide $Y_2O_3$ and 0.25% to 4% by weight of sintering aids, are added. The material thus obtained has a low solidus temperature (well below 2500° C.), which makes it inappropriate for use as a constituent refractory material in the above-mentioned simulation furnaces.

SUMMARY OF THE INVENTION

It is accordingly an object of this invention to provide a hafnium dioxide $HfO_2$ based refractory ceramic material which does not crack during increasing and decreasing temperature cycling, which includes the range from 1500° C. to 1800° C.

A further object of this invention is to provide a hafnium dioxide $HfO_2$ based refractory ceramic material having a solidus temperature greater than 2500° C.

An additional object of this invention is to provide a powder metallurgy process for the manufacture of such a refractory ceramic material and a structural part incorporating this material.

Therefore, an object of this invention is to provide a refractory ceramic material possessing a solidus temperature in the range between 2500° C. and 2800° C., having a compactness greater than 85%, and a microstructure such that the material is composite and comprises:

hafnium dioxide $HfO_2$ grains having a monoclinic structure;
hafnium dioxide $HfO_2$ grains having a cubic structure which is stabilized by yttrium oxide $Y_2O_3$, the yttrium oxide $Y_2O_3$ representing 0.5 mol % to 8 mol % relative to the total number of moles of hafnium dioxide $HfO_2$;
closed pores;
non-interconnected open pores.

Advantageously, the solidus temperature of the refractory ceramic material obtained according to the process of this invention ranges between 2500° C. and 2800° C. The solidus temperature is that temperature below which the last liquid portions of the solidifying material have solidified. It is determined at atmospheric pressure.

Furthermore, by "closed pores" are meant pores which do not communicate with the surface of the material, and by "open pores", pores which communicate with the surface of the material, these open pores having moreover the particular characteristic of not being interconnected.

One of the fundamental characteristics of the refractory ceramic material according to this invention is the particular quantity of yttrium oxide $Y_2O_3$ it contains, namely a quantity of 0.5 mol % to 8 mol % relative to the total number of moles of hafnium dioxide $HfO_2$ (both monoclinic and cubic). This quantity results in the material being a composite, that is, comprising hafnium dioxide $HfO_2$ in two distinct crystalline phases which are homogeneously distributed within the entire volume of the material, namely a phase comprising grains having a cubic structure (stabilized by yttrium oxide $Y_2O_3$) and a phase comprising grains having a monoclinic structure.

Due to this composite nature, the material is only partially stabilized by the formation of a solid solution having a cubic structure.

This has the advantage of both i) avoiding the above-mentioned volume expansion and ii) preserving a solidus temperature as high as possible, and as close as possible to the melting temperature of pure hafnium dioxide $HfO_2$, while avoiding the addition of sintering aids during the manufacture of the material, which may lower its useful working temperature.

In addition, the refractory ceramic material according to this invention has a compactness of more than 85%, and is thus a sufficiently dense material to have an appropriate mechanical strength, in particular up to 2600° C., and to confine as well as possible the gases generated, for example, during the above-mentioned simulation experiments.

Since compactness is the counterpart of porosity, the porosity of the refractory ceramic material of this invention is 15% or less. The measurement unit of compactness or porosity is in volume percent. Porosity can be accounted for by both open pores and closed pores.

Advantageously, a large proportion of the pores of the refractory ceramic material of this invention are closed.

Thus, preferably, the closed pores represent 1% to 15% of the volume of this material. As for the open pores of the material, these represent less than 3%, preferably less than 1%, and still more preferably about 0.5%, of the volume of the material. These open pores are not interconnected, so that, for such pores, they do not extend throughout the refractory ceramic material. Optionally, part or all of the closed pores in the refractory ceramic material is not interconnected.

The closed nature of a large proportion of pores, as well as the fact that the open pores are not interconnected, enhances the gas tightness of the refractory ceramic material according to this invention and increases chemical resistance to gases and liquids by reducing the available exchange surface.

A further object of this invention is to provide a powder metallurgy process for the manufacture of the refractory ceramic material according to this invention, comprising the consecutive steps of:

(i) obtaining a dry mixture of a hafnium dioxide $HfO_2$ powder and an yttrium oxide $Y_2O_3$ powder, each of these oxides being mixed in the molar proportions in which it is found in the ceramic material, (ii) step of granulation by pelletization of the dry mixture under stirring in order to obtain a granulated mixture, this granulation step comprising the spraying, into the dry mixture, of an aqueous solution comprising, relative to the weight of the dry mixture, 5% by weight of polyvinyl alcohol (PVA) having a molecular weight in the range between 50000 and 90000 g/mol and 5% by weight of polyethylene glycol (PEG) having a molecular weight in the range between 180 and 420 g/mol, (iii) drying of the granulated mixture and then filling of a mold with said granulated mixture, (iv) uniaxial pressing of the granulated mixture in order to obtain a compact mixture, this pressing comprising the application of a plateau shaping stress of 20 MPa to 50 MPa, preferably 30 MPa, and (v) sintering of the compact mixture in order to obtain the refractory ceramic material.

The PVA and PEG comprised in the aqueous solution act as a binder and a plasticizer, respectively. They are removed by pyrolysis during the temperature rise to the sintering temperature.

Generally, the homogeneous distribution of a small amount of one powder within another is a delicate problem. This problem is even more complicated because the dry mixture of the present invention comprises two powders with rather different densities (namely, density of pure $HfO_2$=9.68 $g \cdot cm^{-3}$; density of pure $Y_2O_3$=5 $g \cdot cm^{-3}$).

However, it is very important to obtain a dry mixture wherein both of these powders are homogeneously distributed, since an increase in the $Y_2O_3$ content in any area of the material may generate stresses rendering this material inappropriate for sintering and, after sintering, may produce a heterogeneous material and cause a large decrease in the solidus temperature within this area, and therefore, embrittlement of the entire ceramic material, imposing its use at temperatures lower than those expected.

The inventors have found that a step of granulation by pelletization alone, combined with the specific aqueous solution according to this invention, allows a granulated mixture to be produced wherein, on the one hand, the $HfO_2$ and $Y_2O_3$ powders are distributed homogeneously, and on the other hand, the dense granules have both sufficient mechanical strength to be manipulated and a deformation ratio enabling flattening to be carried out during the pressing step. According to this invention, by "granulation by pelletization" is meant a process wherein an organic suspension is sprayed onto a spinning ceramic powder within a slanted rotating table.

After drying, the obtained granulated mixture is sintered in order to obtain a refractory ceramic material according to this invention, which is both a composite (that is, the hafnium dioxide $HfO_2$ grains are of two types, namely grains of a monoclinic structure and of a cubic structure stabilized by yttrium oxide $Y_2O_3$), and homogeneous (these grains being distributed homogeneously throughout the entire volume of the material).

This material undergoes no cracking and a large proportion of its porosity is of the closed type. Without being bound to any particular theory, this unexpected closed porosity may be attributed to the Kirkendall effect, which is specific to the $HfO_2$—$Y_2O_3$ combination. This is even more surprising because, in spite of the significant amount of plasticizer contained in the aqueous solution (namely 5% by weight of polyethylene glycol), the ceramic material obtained by the process according to this invention is nonetheless sufficiently dense, with a measured compactness greater than 85%.

Further objects, features and advantages of the invention will become more apparent from the following description, which is non-limitative and given for the purpose of illustration.

BRIEF DESCRIPTION OF THE DRAWINGS

This invention also includes two appended Figures, which are explained in the following examples.

DETAILED DESCRIPTION OF THE INVENTION

1—Powder Metallurgy Process for the Manufacture of Refractory Ceramic Materials Comprising 1 mol % $Y_2O_3$.

1.1—Dry Mixing of the $HfO_2$ and $Y_2O_3$ Powders

In order to make an $HfO_2$ refractory ceramic material comprising 1 mol % $Y_2O_3$, 99.93 g of an $HfO_2$ powder and 1.07 g of a $Y_2O_3$ powder, representing 99 mol % and 1 mol % of the final mixture, respectively, were mixed together.

The hafnium dioxide $HfO_2$ powder available from CEZUS (France), had the following characteristics:
Purity=99.9% by weight.
Specific surface (BET)=12.99 $m^2/g$.
Dense particle size (BET)=47.6 nm, calculated from the specific surface assuming the grains to be spherical.
Average grain size=2 μm, as measured by a wet process with a laser granulometer after adding ammonium polymethacrylate as a dispersant (marketed under the brand name DARWAN C).
Crystal system: mostly monoclinic (density=9.7 $g \cdot cm^{-3}$).

The specific surface (BET) and the dense particle size (BET) were determined by nitrogen adsorption according to the ISO 9277:1995 standard established according to the Brunauer-Emmett-Teller (so-called BET) method.

The main chemical elements forming impurities (in ppm by weight relative to hafnium dioxide $HfO_2$) were as follows:

| |
|---|
| Al < 100 |
| Ca < 25 |
| Cd < 20 |
| Mo < 20 |
| Na < 20 |
| Ni < 100 |
| Co < 20 |
| Cr < 20 |
| Cu < 100 |
| P < 20 |
| Pb < 20 |
| Sn < 20 |
| Fe < 100 |
| Mg < 20 |
| Mn < 0 |
| Ti < 100 |
| V < 20 |

The yttrium oxide $Y_2O_3$ powder, available from PIDC (USA), had the following characteristics:
Purity=99.999% by weight.
Density=5.01 $g \cdot cm^{-3}$
Specific surface (BET)=2.38 $m^2/g$.
Dense particle size (BET)=0.5 μm, as calculated based on the specific surface and assuming the grains to be spherical.
Average grain size=3 μm, as measured by a wet process with a laser granulometer after adding DARWAN C as a dispersant.

The powders were mixed in the dry state by means of a non-specific ceramic powder mixer (here, of type Turbula®) for a minimum time period of 20 minutes.

1.2—Step of Granulation by Pelletization

To perform the step of granulation by pelletization of the dry mixture of powders, stirring was maintained within a slanted rotating table while gradually spraying into the dry mixture of powders an aqueous solution comprising polyvinyl alcohol (PVA) having a molecular weight in the range between 50000 and 90000 g/mol and polyethylene glycol 300 (PEG 300), the sprayed quantities of PVA and PEG each representing 5% by weight based on the weight of the dry mixture of powders.

According to this invention, PEG 300 is a polyethylene glycol having a molecular weight in the range between 285 and 315 g/mol.

1.3—Drying

The obtained granulated mixture was dried in an oven at 50° C. until the granules were dry which, in the present case, corresponds to a period of 20 minutes. A drying temperature in the range between 40° C. and 60° C. may also be appropriate. This avoids excessive hardening of the binder (PVA), which would make the granules incompressible during the pressing step.

1.4—Screening

The granulated and dried mixture obtained by a "dry process" in the previous steps was then introduced into an automatic screening machine to be subjected to a double screening operation so that it contains only granules with a size in the range between 60 and 250 μm. This granule size is sufficiently large for its flow properties to permit correct filling of the mold. Also, it is small enough for the granules not to induce flaw during the pressing operation, such as a local lack of the mixture which may lead to the appearance of a macropore, which would be impossible to remove during sintering.

1.5—Pressing

To produce a compact mixture, the mixture of granulated powders was introduced into a pellet-shaped mold. The pressing die was 25 mm in diameter. The mold was made of steel. Care was taken to fill the mold slowly so that filling was as complete as possible, thus avoiding the occurrence of defects which would be impossible to remove during sintering. The mixture of granulated powders was then subjected to the following pressing cycle during which the compacting pressure underwent the following changes:

a pressure increase at a rate of 0.1 MPa/s up to a shaping stress plateau (or pressure plateau) of 30 MPa, which was maintained for 2 minutes, followed by a decrease in the 30 MPa shaping stress plateau at a rate of 0.1 MPa/s down to atmospheric pressure.

Alternatively, the pressure increase may be carried out according to at least one rate in the range between 0.1 and 1 MPa/s, the shaping stress plateau may be at least 20 MPa and in any case should not reach values much in excess of 50 MPa (for example, as high as 100 MPa) so as to prevent any cracking of the material after sintering, the shaping stress plateau may be maintained for a duration in the range from 60 s to 180 s, and may be decreased at a rate in the range between 0.1 and 1 MPa/s down to atmospheric pressure.

After this pressing step, a compact pellet 13 mm in diameter and 2 mm in thickness was obtained.

Preferably, the structural parts according to this invention have a geometry such that they have a material thickness of 10 mm or less in at least one considered cross-sectional plane so as to facilitate removal of the binder and/or plasticizer during the sintering step.

1.6—Sintering.

The compact pellet was sintered in air according to the following cycle: an increase in temperature at a rate of 5° C./min up to a temperature of 1600° C., which was maintained at this value for 1 hour, followed by a decrease in temperature at the natural cooling rate of the furnace.

Various sintering cycles under an air atmosphere were tested to assess the influence of the temperature and the time plateau on compactness and open porosity. Thanks to these tests it was possible to determine that another sintering cycle, which may also be appropriate, comprises the heating of the compact mixture to a temperature in the range between 1550° C. and 1650° C., for a duration in the range between 30 minutes and 90 minutes. If such conditions are not fulfilled, an open porosity ratio which is unsuitable for the containment of gases might be obtained.

Moreover, through other tests it was shown that for the same sintering cycle, the larger the yttrium oxide $Y_2O_3$ content, the smaller the sintering shrinkage and the higher the temperature at which the compact pellet begins to densify (900° C. for a pure $HfO_2$ pellet as opposed to 1200° C. for a $HfO_2$ pellet comprising 8 mol % $Y_2O_3$).

Advantageously, the solidus temperature of the refractory ceramic material of this invention must be in the range between 2500° C. and 2800° C. To obtain this material with sufficient compactness, it is therefore expected that a high sintering temperature should be applied, which will in any case be much larger than the upper bound that can be reached by standard sintering furnaces which, in general, never exceed 1700° C. to 1800° C.

Even though other furnaces may generate temperatures in excess of 1800° C., they generally work under a neutral or reducing atmosphere and have rarely been developed in this industry. These furnaces most often use heating elements and refractory materials made of carbon. However, carbon interacts with hafnium dioxide $HfO_2$, thus making the use of such furnaces inappropriate for sintering a mixture of powders comprising $HfO_2$.

Unexpectedly, although the sintering step according to this invention comprises the heating at temperatures in the vicinity of 1600° C., it nevertheless makes it possible to obtain a sufficiently compact ceramic material with a large closed porosity ratio. This also allows standard furnaces to be employed.

1.7—Machining-Grinding.

In order to make a structural part for a simulation furnace, the refractory ceramic material pellet obtained in the previous step was machined into a spur shape.

Machining did not generate any cracking in the material.

2—Powder Metallurgy Process for the Manufacture of the Refractory Ceramic Powders Comprising 3 mol %, 5 mol % and 8 mol % $Y_2O_3$.

$HfO_2$-based refractory ceramic materials comprising 0.5%, 3%, 5% and 8% $Y_2O_3$, respectively, were manufactured according to the same process as in Example 1, except that the $Y_2O_3$ powder quantities involved in the mixing step (i) were adapted in order to obtain the desired molar proportions in the ceramic material.

3—Microstructure of the Refractory Ceramic Materials Comprising 1 mol %, 3 mol %, 5 mol % and 8 mol % $Y_2O_3$.

3.1—Derivation by X-Ray Diffraction of the Volume Fraction of Material Occupied by Hafnium Dioxide $HfO_2$ Grains Having a Monoclinic or Cubic Structure.

The volume fractions of the monoclinic and cubic phases within the material were determined.

The principle used for that purpose is to obtain an X-ray diffraction spectrum and to compare the strength of line 111 of the cubic phase with the sum of the strengths of the 1 and −1 combination lines of the monoclinic phase.

Nevertheless, the strengths of these lines were corrected in order to separate the peaks of these cubic and monoclinic phases, which are located within close angular domains.

Since hafnium dioxide $HfO_2$ has a similar diffraction pattern to that of zirconia $ZrO_2$, this correction was based on zirconia data according to the research work of D. L PORTER and A. H HEURE (Journal of American Ceramist Society, 1979, 62 (5-6), 298-305).

These authors have shown (by taking into account the multiplicity factor and the linear absorption coefficient) that the volume fraction $V_m$ of the monoclinic phase in zirconia stabilized by magnesia MgO could be written as:

$$V_m = (1.6031 \times I_m(11-1))/(1.6031 \times I_m(11-1) + I_c(111)),$$

where $I_m(11-1)$ and $I_c(111)$ designate the strengths of the X-ray diffraction lines of the monoclinic and cubic phases, respectively.

By analogy with the research work of PORTER et al., the volume fraction occupied by hafnium dioxide $HfO_2$ grains having monoclinic and cubic structures was thus determined for the refractory ceramic materials comprising 1%, 3%, 5% and 8% $Y_2O_3$ prepared in the above examples, by measuring the strengths of the X-ray diffraction lines of the hafnium dioxide $HfO_2$ monoclinic and cubic phases.

Table 1 summarizes these results. It also shows the volume fraction that the cubic phase should theoretically occupy according to the $HfO_2$—$Y_2O_3$ phase diagram taken from the document by N. ISUPOVA et al., "The $HfO_2$-$Y_2O_3$ system in the region rich in hafnium dioxide, Inorganic material, 1969, 11, no 5, 1658-1661."

TABLE 1

| Mol % $Y_2O_3$ | % monoclinic | % cubic | % cubic, theoretical |
|---|---|---|---|
| 1% | 90% | 10% | 0% |
| 3% | 61% | 39% | 13% |
| 5% | 57% | 43% | 50% |
| 8% | 37% | 63% | 87% |

Unexpectedly, in spite of what is shown by the $HfO_2$ $Y_2O_3$ phase diagram, the volume fraction occupied by the hafnium dioxide $HfO_2$ grains having a cubic structure is greater, relative to that which was theoretically expected, for refractory ceramic materials comprising 1% and 3% $Y_2O_3$, and smaller for refractory ceramic materials comprising 5% and 8% $Y_2O_3$. Thus, the refractory ceramic material according to this invention is a material which is not in thermodynamic equilibrium. Advantageously, this allows stabilization to be achieved by means of the hafnium dioxide $HfO_2$ grains whose cubic structure is appropriately adjusted, that is in such a way that the refractory ceramic material according to this invention has a sufficiently high solidus temperature without suffering from cracking during a cooling phase including a transition through a temperature of about 1700° C.

3.2—Distribution Throughout the Material of Hafnium Dioxide $HfO_2$ Grains Having Monoclinic and Cubic Structures.

The refractory ceramic materials of the above example were analyzed by means of a SEM in the backscattered electron mode. The micrographs corresponding to the refractory ceramic materials comprising 8%, 5%, 3% and 1% $Y_2O_3$ are shown in FIGS. 1A, 1B, 1C and 1D respectively. In the micrographs thus obtained, the grey level is inversely proportional to the average atomic number of the chemical element analyzed. Yttrium oxide $Y_2O_3$ contained in the stabilized cubic hafnium dioxide $HfO_2$ phase (2) thus corresponds to the dark grey areas.

Without being bound to any particular theory, the presence of the stabilized cubic hafnium dioxide $HfO_2$ phase (2) surrounding at least one closed pore (3) suggests that the Kirkendall effect is involved. This effect is caused by the difference between the diffusion rates of the two cations, yttrium $Y^{3+}$ and hafnium $Hf^{4+}$, within the cubic phase and causes the volume occupied before sintering by the $Y_2O_3$ grains to be replaced at the end of sintering by a pore. When the agglomeration of several pores (5) is not taken into account, it may be seen that the closed pores have an average size of 3 μm (preferably in the range between 1 μm and 10 μm, thus corresponding to the average size the yttrium oxide $Y_2O_3$ powder grains may have, which size may be determined by laser granulometry, as mentioned above).

3.2.1—Refractory Ceramic Materials Comprising 3 mol %, 5 mol % and 8 mol % $Y_2O_3$.

Figure 1A:
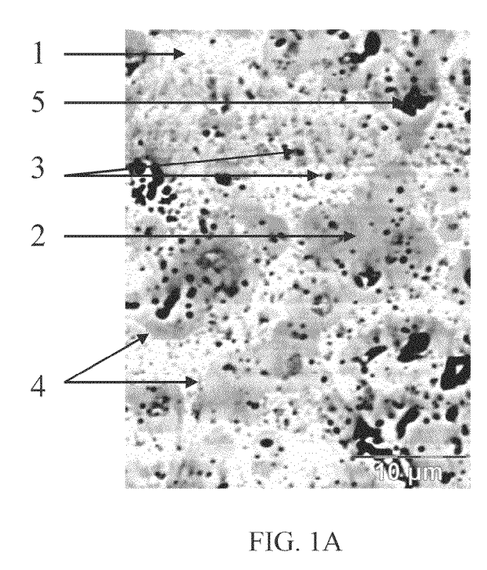
FIGS. 1A, 1B, 1C and 1D illustrate micrographs of the refractory ceramic materials of this invention obtained using a Scanning Electron Microscope (SEM) in the back-scattered electron mode.
Figure 1B:
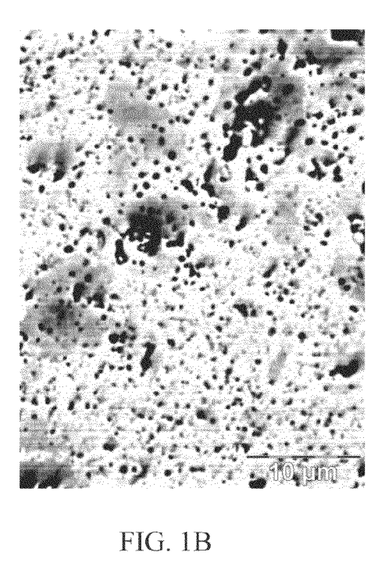
Figure 1C:
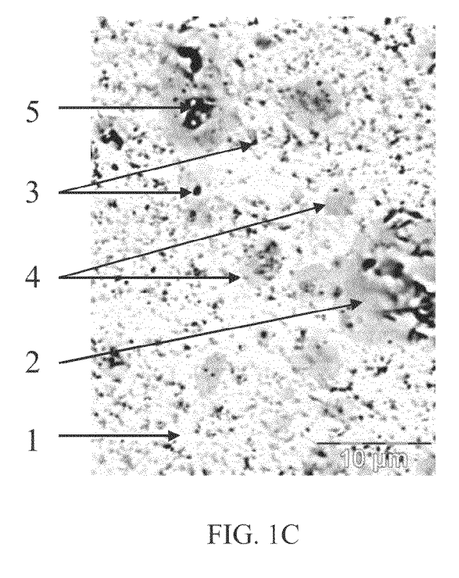

For materials comprising 8%, 5% and 3% $Y_2O_3$, the grains of the cubic hafnium dioxide $HfO_2$ phase (2) stabilized by 3 mol % to 8 mol % yttrium oxide $Y_2O_3$ undergo segregation since they are distributed mainly around at least one closed pore (3). Thus, within the monoclinic hafnium dioxide $HfO_2$ (1), they form inclusions (4), each of which comprises at least this closed pore (3).

Figure 2:
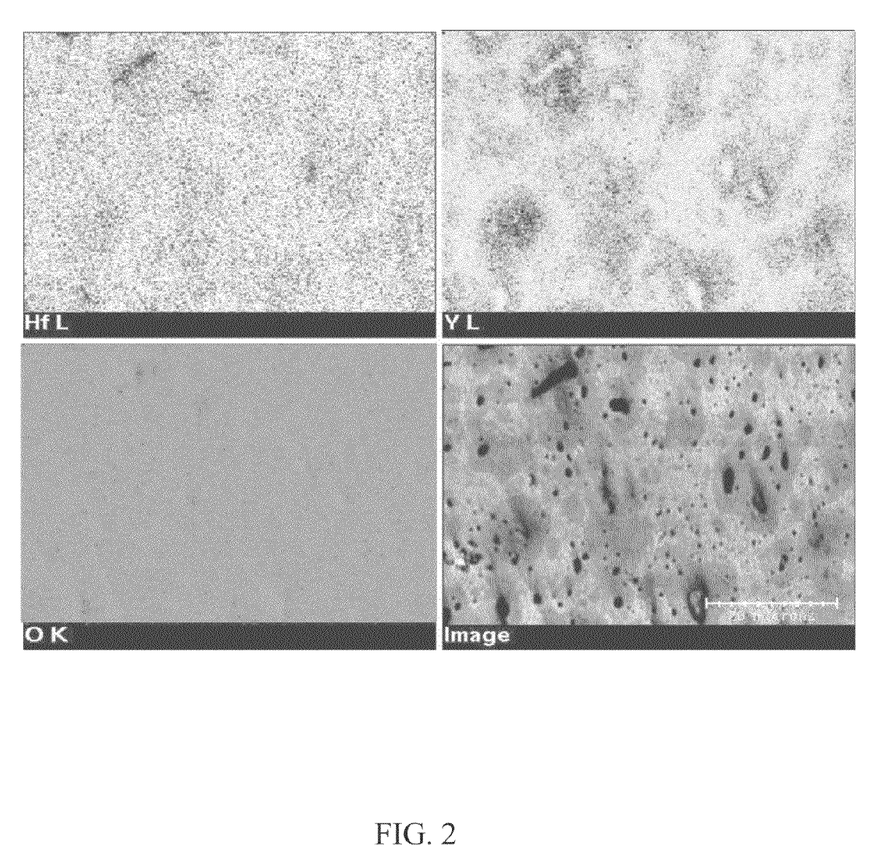
FIG. 2 illustrates an Energy Dispersive Spectrometer mapping of a refractory ceramic material according to this invention, as well as a SEM reference micrograph in the backscattered electron mode.

Taking for example the material comprising 8% $Y_2O_3$, this segregation is confirmed by the mapping carried out using an Energy Dispersive Spectrometer, as shown in the pictures in the upper portion of FIG. 2.

The pictures in the upper left and right portions of FIG. 2 show the distribution of the hafnium and yttrium elements within this material, respectively. Based on these two pictures, it is thus possible to confirm the homogeneity of the distribution of hafnium dioxide $HfO_2$, and the segregation of yttrium oxide $Y_2O_3$, which is the element doping and stabilizing the grains in the cubic hafnium dioxide $HfO_2$ phase (2), in the form of inclusions.

The pictures in the lower left and right portions of FIG. 2 show the mapping obtained by means of an Energy Dispersive Spectrometer for elemental oxygen, and, as a reference, a backscattered electron SEM picture of the material comprising 8% $Y_2O_3$, respectively.

3.2.2—Refractory Ceramic Materials Comprising 1 mol % $Y_2O_3$.

Figure 1D:
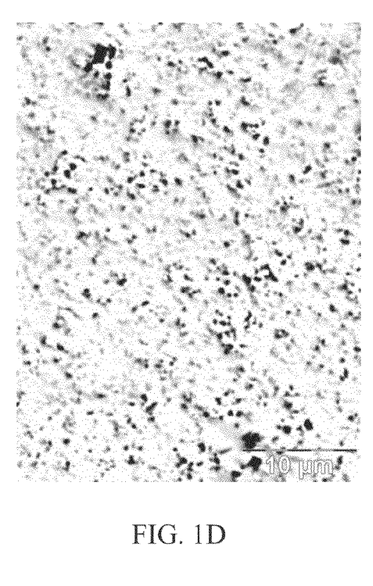

For the materials comprising 1% $Y_2O_3$ (for which, typically, the cubic hafnium dioxide $HfO_2$ grains are stabilized by 0.7 mol % to 1.5 mol % yttrium oxide $Y_2O_3$), the cubic hafnium dioxide $HfO_2$ grains are homogeneously distributed throughout the volume of the ceramic material. The agglomeration of several pores (5) has virtually disappeared from the material.

The distribution is homogeneous in that it is not possible to detect any segregation or inclusions (4) of the cubic hafnium dioxide $HfO_2$ phase (2), by means of a backscattered electron SEM picture, within the phase consisting of monoclinic hafnium dioxide $HfO_2$ (1). This results in an increase of the cracking resistance during increases/decreases in temperature between 1500° C. and 1800° C.

As a result of this excellent homogeneity in the microstructure of the material, the latter does not contain areas in which the yttrium oxide $Y_2O_3$ is locally more concentrated than within the rest of the material. In other words, the 0.7 mol % to 1.5 mol %, preferably, the 1 mol % yttrium oxide $Y_2O_3$ content is observed in practice throughout the volume of the material. This has the advantage that the solidus temperature is nearly the same throughout the material, namely of the order of 2800° C., and that it does not decrease locally due to a higher yttrium oxide $Y_2O_3$ content, which would generate hot spots acting as sources of mechanical brittleness in the material.

4—Characteristics of Refractory Ceramic Materials Comprising 1 mol %, 3 mol %, 5 mol % and 8 mol % $Y_2O_3$.

4.1—Measurement of Compactness.

In order to determine compactness, the calculation explained below for the refractory ceramic material manufactured according to Example 2 and comprising 5 mol % $Y_2O_3$ was performed as follows:

1) The density of the hafnium dioxide $HfO_2$ cubic phase comprising 5 mol % $Y_2O_3$ (this phase being referred to in the following calculation as the "cubic solid solution") was computed on the basis of the data disclosed in the above-mentioned document by N. ISUPOVA. The authors of this document have shown that the lattice parameter of hafnium dioxide $HfO_2$ in its cubic phase varies with the $Y_2O_3$ percentage and calcination temperature.

Based on this document, the crystallographic quantities of the cubic solid solution resulting from calcination at 1600° C. may be estimated. The lattice parameter of the cubic solid solution is thus estimated to be 5.105 Å. Therefore, the volume of a lattice unit is: $V_{lattice\ 5\%} = (5.105\ 10^{-10}) = 1.3304\ 10^{-28}\ m^3$.

The authors have also found that the cubic solid solution had a fluorite type of structure of formula $(Hf_{(1-2x)}Y_{2x})O_{(2-x)}$. This structure has a number of repeating units Z=4.

Moreover, since 100 moles of the cubic solid solution contain 5 mol % $Y_2O_3$, then x=0.05 moles.

For the cubic solid solution, the molar weight (5% molar W), the weight of a lattice unit (5% w), and the density are therefore computed as follows:

5% molar $W=(1-2x)W_{Hf}+2\times W_Y+(2-x)W_O=(1-(2\times 0.05))\times 178.5)+(2\times 0.05\times 88.9)+(2-0.05)\times 16=200.74$ g/mol     i)

5% $w$=5% molar $W$/Avogadro's number=200.74/ 6.023 $10^{23}$=3.33 $10^{-22}$ g     ii)

5% density=(5% $w\times Z$)/$V$(cm$^3$)=(3.33 $10^{-22}\times 4$)/1.3304 $10^{-22}$=10.01 g·cm$^{-3}$     iii)

2) The theoretical density of each material was then computed by deriving the respective contributions of the densities of the monoclinic (Dm=9.68 g. m$^{-3}$) and cubic (Dc=10.01 g·cm$^{-3}$) hafnium dioxide $HfO_2$ phases as a function of the volume fraction that each phase occupies within the material.

The computation based on the values listed in Table 2 is as follows:

Density $(HfO_2/HfO_2+5\%\ Y_2O_3)=(Vm\times Dm)+(Vc\times Dc)$ =9.84 g·cm$^{-3}$

TABLE 2

$HfO_2$ + 5 mol % $Y_2O_3$ sintered at 1600° C. for 1 h

| Monoclinic phase | | Cubic phase for 5 mol % $Y_2O_3$ | |
|---|---|---|---|
| Volume fraction (Vm) | Density (Dm) | Volume fraction (Vc) | Density (Dc) |
| 56.8% | 9.68 g · cm$^{-3}$ | 43.2% | 10.01 g · cm$^{-3}$ |
| | Total density = 9.84 g · cm$^{-3}$ | | |

3) The compactness of the cubic solid solution was computed by deriving the ratio of the theoretical density determined according to point 2, to the density measured according to the usual geometry-based method:

compactness=(8.78/9.84)×100=90.8%.

Similar computations were carried out for the 1 mol %, 3 mol % and 8 mol % $Y_2O_3$ refractory ceramic materials (manufactured according to Examples 1 and 2 above) as well as for the corresponding materials containing 0 mol % and 0.5 mol % $Y_2O_3$. The compactness values (referred to as $C_1$) thus determined are given in Table 3 shown in FIG. 3.

4.2—Measurement of Other Characteristics

Other characteristics were determined for the ceramic materials prepared according to the previous examples. The results are summarized in Table 3 shown in FIG. 3. They were obtained as follows.

As explained above, porosity is the complement of compactness (noted $C_1$) as computed in the previous examples (both quantities being expressed as percentages by volume of material). The porosity is then determined by subtracting the compactness from the total volume of the refractory ceramic material according to this invention.

Moreover, the porosity is of two different types: open or closed. Open porosity is measured according to a method known to those skilled in the art such as the immersion method carried out using a vacuum chamber. Its subtraction from the total porosity leads to the closed porosity value.

As for the non-interconnected nature of the open porosity of the refractory ceramic material according to this invention, this is assessed qualitatively based on methods known to those skilled in the art, which demonstrate the non-traversing nature of such pores.

Among those methods, is a tightness test such as the bubbling test. This test consists in immersing a material sample, such as a tube having one closed end, into a water container. Air is then blown under pressure into the tube with its closed end upwards. If the open porosity "traverses" the material, air will pass through the tube's wall until air bubbles form on its outer surface. However, if the open pores are not interconnected, the tube is airtight and no air bubbles will form.

Figure 4A:
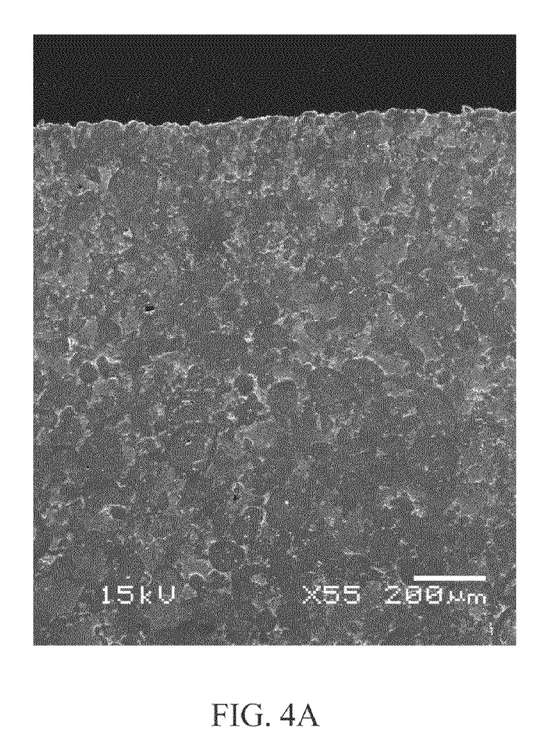
FIG. 4A shows a secondary electron SEM micrograph of a refractory ceramic material according to this invention (with a magnification factor of 55).
Figure 4B:
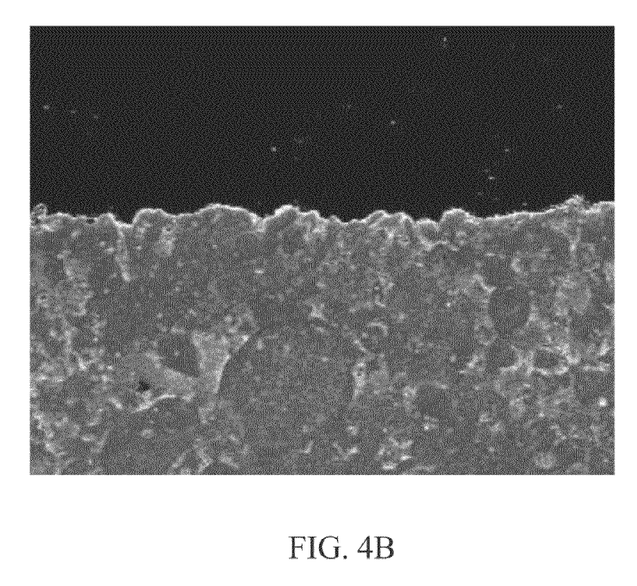
FIG. 4B is an enlargement of the upper left portion of FIG. 4A.

Another method consists in cutting several cross-sections of the material and checking, from a picture taken with a secondary electron SEM, whether the open pores in this material are interconnected. As an example, FIGS. 4A and 4B show such a SEM picture of a cross-section of a refractory ceramic material according to this invention comprising 3 mol % $Y_2O_3$. These clearly show that the pores reaching the surface of the material (open pores) are not interconnected. This method may also be used to determine whether closed pores are interconnected or not.

Compactness $C_2$ was also measured. This corresponds to the material's compactness after reaching a temperature of 1800° C. It was determined according to the methodology explained in point 4.1, after the ceramic materials had been maintained at a temperature of 1800° C. for 30 minutes and then allowed to cool down at the natural cooling rate of the furnace. It was not measured for the 0.5% ceramic material.

The difference between the compactness values $C_1$ and $C_2$ makes it possible to determine the magnitude of the volume difference of the ceramic material during a cooling phase including a transition through a temperature of about 1700° C.

Finally, no cracking was observed in the ceramic materials comprising 3 to 8% $Y_2O_3$. The observed cracking of the 1% $Y_2O_3$ ceramic material was quite superficial. Cracking only appeared on pellet edges, no cracking being detected through optical microscopy.

Figure 3:
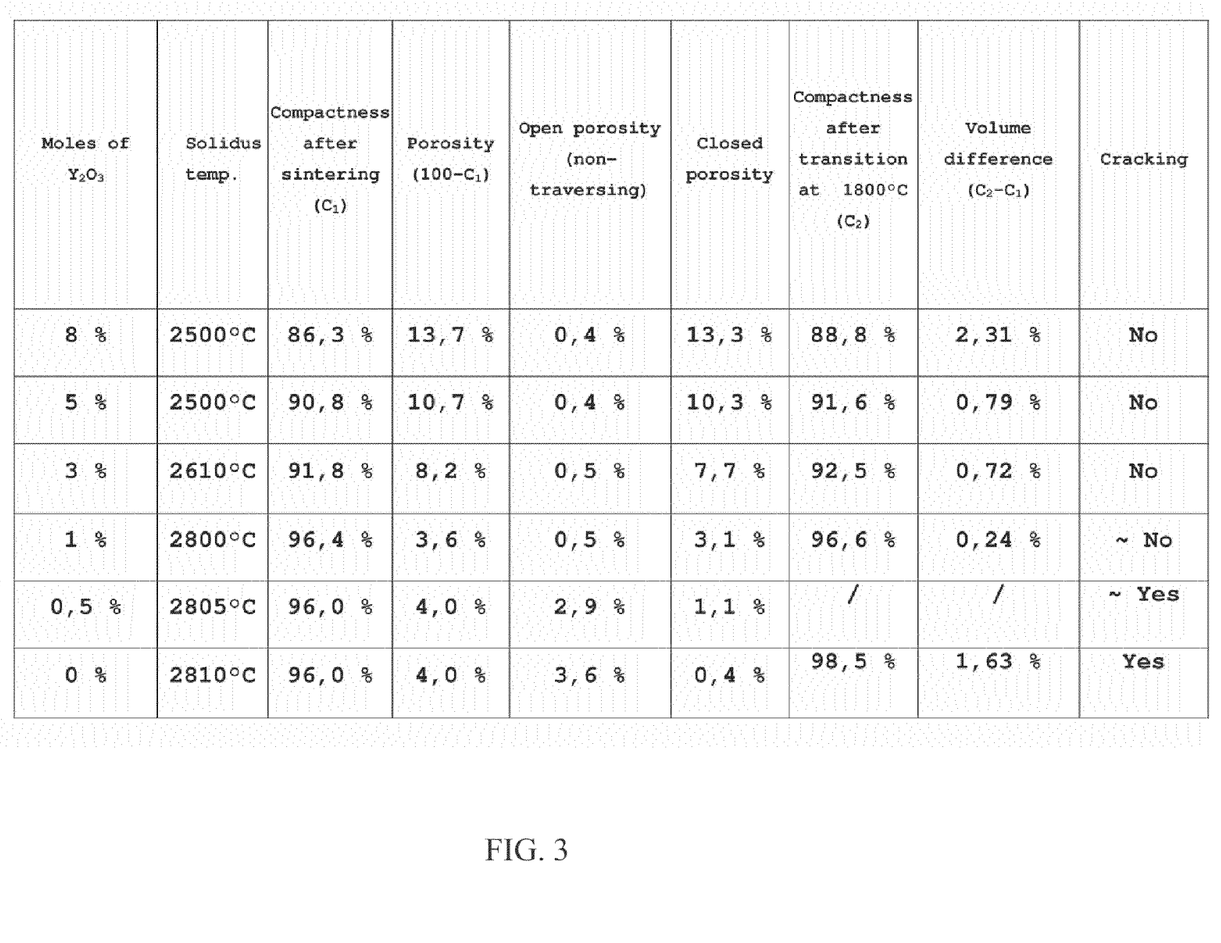
FIG. 3 shows a Table listing different characteristics (in particular with regard to the microstructure) of refractory ceramic materials according to this invention.

In particular, it appears from the different characteristics given in Table 3 of FIG. 3 that:

The refractory ceramic materials according to this invention comprising 3 mol % to 8 mol % $Y_2O_3$ may have a porosity in the range between 8% and 15% and a closed porosity in the range between 7% and 15%. Open porosity is generally about 0.5%.

The refractory ceramic materials according to this invention comprising 3 mol % to 5 mol % $Y_2O_3$ may have a porosity in the range between 8% and 11% and a closed porosity in the range between 7% and 11%. Open porosity is generally about 0.5%.

The refractory ceramic materials according to this invention comprising 0.7 mol % to 1.5 mol % $Y_2O_3$ may have at least one of the following characteristics: a porosity in the range between 4% and 6%, a closed porosity in the range between 1% and 5%, an open porosity in the range between 0.5% and 2% which increases when the number of $Y_2O_3$ moles decreases, a compactness of 96% to 97%, and cubic hafnium dioxide $HfO_2$ grains occupying between 5% and 18% of the volume of said ceramic material.

Moreover, preferably, the microstructure of the refractory ceramic materials according to this invention which comprise 0.5 mol % to 8 mol % yttrium oxide $Y_2O_3$ is such that:

the hafnium dioxide $HfO_2$ grains with a monoclinic structure have an elongated shape and/or an average size in the range between 1 μm and 3 μm, the hafnium dioxide $HfO_2$ grains with a cubic structure stabilized by yttrium oxide $Y_2O_3$ have a symmetrical shape with a square cross-section and/or an average size in the range between 3 μm and 15 μm.

Figure 5A:
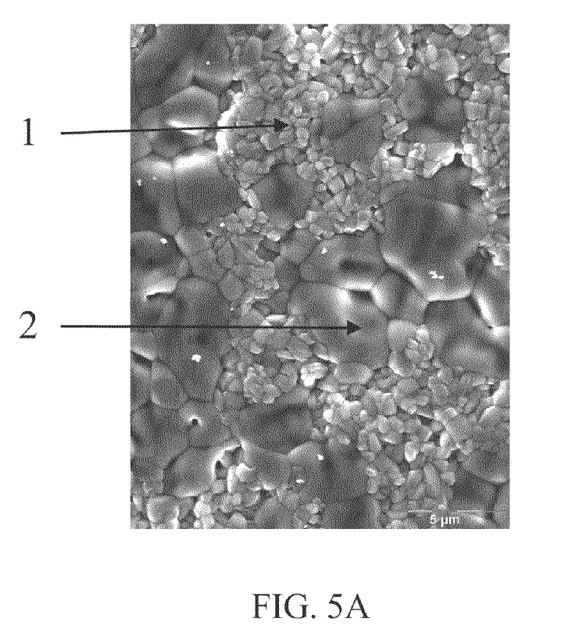
FIGS. 5A and 5B illustrate secondary electron SEM micrographs for refractory ceramic materials according to this invention, which have been subjected to a treatment permitting some of their microstructural characteristics to be revealed.
Figure 5B:
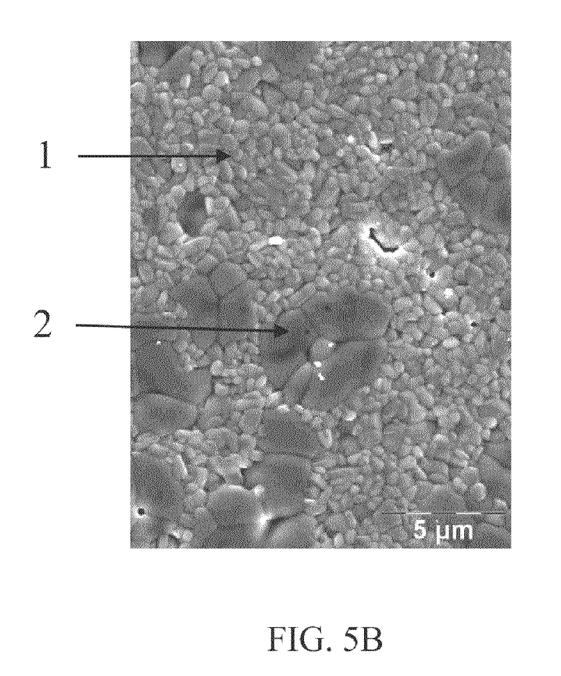

These microstructural characteristics may in particular be determined from SEM pictures of the material according to this invention, after processing according to a method known to those skilled in the art such as polishing followed by thermal or chemical etching at the grain boundaries. FIGS. 5A and 5B show such pictures for the refractory ceramic materials according to this invention comprising 8 mol % and 5 mol % yttrium dioxide $Y_2O_3$, respectively. They clearly show some of the above-mentioned microstructural characteristics for hafnium dioxide $HfO_2$ grains having a monoclinic (1) and a cubic (2) structure stabilized by yttrium oxide $Y_2O_3$.

The ceramic materials comprising 1 mol % (in practice, from 0.7% to 1.5%) $Y_2O_3$ were found to be of particular interest because they combine a high solidus temperature, a possibly large closed porosity, a good cracking strength, a high compactness and a small volume expansion when cooled below 1800° C. Their high compactness (and therefore density) also results in these materials having better mechanical strength, in particular up to a temperature of 2600° C.

From the above, it clearly appears that the microstructure of a refractory ceramic material having a compactness greater than 85% endows it with properties making it suitable for use in the composition of structural parts of furnaces for the study of the behavior of a nuclear fuel during a core meltdown accident in a nuclear reactor. In particular, such a material does not undergo cracking during temperature increase/decrease cycles which include the range from 1500° C. to 1800° C., and has a solidus temperature greater than 2500° C.

More generally, such a material may also enter the composition of devices for high temperature thermal analyses such as devices for Thermo-gravimetric Analysis (TGA), Differential Thermal Analysis (DTA) or a dilatometer.

The invention claimed is:

1. A refractory ceramic material possessing a solidus temperature between 2500° C. and 2800° C., having a compactness greater than 85%, and a microstructure such that said material is composite and comprises:
hafnium dioxide $HfO_2$ grains having a monoclinic structure (1);
hafnium dioxide $HfO_2$ grains having a cubic structure (2) which is stabilized by yttrium oxide $Y_2O_3$, said yttrium oxide $Y_2O_3$ representing 0.5 mol % to 8 mol % relative to the total number of moles of hafnium dioxide $HfO_2$;
closed pores (3);
non-interconnected open pores.

2. The refractory ceramic material according to claim 1, characterized in that said open pores represent less than 3% of the volume of said ceramic material.

3. The refractory ceramic material of claim 2, wherein the open pores represent less than 1 percent of the volume of the ceramic material.

4. The refractory ceramic material of claim 2, wherein the open pores represent less than 0.5 percent of the volume of the ceramic material.

5. The refractory ceramic material according to claim 2, characterized in that said cubic hafnium dioxide $HfO_2$ is stabilized by 3 mol % to 8 mol % yttrium oxide $Y_2O_3$ in order to form inclusions (4), each comprising at least one closed pore (3), within said monoclinic hafnium dioxide $HfO_2$.

6. The refractory ceramic material according to claim 2, characterized in that the grains of said cubic hafnium dioxide $HfO_2$ are stabilized by 0.7 mol % to 1.5 mol % yttrium oxide $Y_2O_3$.

7. The refractory ceramic material according to claim 1, characterized in that said cubic hafnium dioxide $HfO_2$ is stabilized by 3 mol % to 8 mol % yttrium oxide $Y_2O_3$ in order to form inclusions (4), each comprising at least one closed pore (3), within said monoclinic hafnium dioxide $HfO_2$.

8. The refractory ceramic material according to claim 7, characterized in that said cubic hafnium dioxide $HfO_2$ is stabilized by 3 mol % to 5 mol % yttrium oxide $Y_2O_3$.

9. The refractory ceramic material according to claim 8, characterized in that said closed pores have an average size of 3 μm.

10. The refractory ceramic material according to claim 8, characterized in that said grains of monoclinic hafnium dioxide $HfO_2$ occupy from 37% to 61% of the volume of said ceramic material.

11. The refractory ceramic material according to claim 7, characterized in that said closed pores have an average size of 3 μm.

12. The refractory ceramic material according to claim 7, characterized in that said grains of monoclinic hafnium dioxide $HfO_2$ occupy from 37% to 61% of the volume of said ceramic material.

13. The refractory ceramic material according to claim 1, characterized in that the grains of said cubic hafnium dioxide $HfO_2$ are stabilized by 0.7 mol % to 1.5 mol % yttrium oxide $Y_2O_3$.

14. The refractory ceramic material according to claim 13, characterized in that said material has a compactness of 96% to 97%.

15. The refractory ceramic material according to claim 13, characterized in that said cubic hafnium dioxide $HfO_2$ is stabilized by 1 mol % yttrium oxide $Y_2O_3$.

16. The refractory ceramic material according to claim 9, characterized in that the grains of said cubic hafnium dioxide $HfO_2$ occupy 10% of the volume of said ceramic material.

17. The refractory ceramic material according to claim 16, characterized in that said material has a solidus temperature of about 2800° C.

18. The refractory ceramic material according to claim 15, characterized in that said material has a solidus temperature of about 2800° C.

19. The refractory ceramic material according to claim 15, characterized in that the grains of said cubic hafnium dioxide $HfO_2$ are homogeneously distributed throughout the volume of said ceramic material.

20. The refractory ceramic material according to claim 15, characterized in that the grains of said cubic hafnium dioxide $HfO_2$ are homogeneously distributed throughout the volume of said ceramic material.

21. A structural part comprising the refractory ceramic material according to claim 1.

* * * * *